(12) United States Patent
Armstrong et al.

(10) Patent No.: US 10,677,195 B2
(45) Date of Patent: Jun. 9, 2020

(54) ENGINE DRIVEN BY $SC0_2$ CYCLE WITH INDEPENDENT SHAFTS FOR COMBUSTION CYCLE ELEMENTS AND PROPULSION ELEMENTS

(71) Applicants: Rolls-Royce Corporation, Indianapolis, IN (US); Rolls-Royce North American Technologies, Inc., Indianapolis, IN (US)

(72) Inventors: Michael J. Armstrong, Avon, IN (US); Igor Vaisman, Carmel, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 218 days.

(21) Appl. No.: 15/962,178

(22) Filed: Apr. 25, 2018

(65) Prior Publication Data

US 2018/0238269 A1 Aug. 23, 2018

Related U.S. Application Data

(63) Continuation of application No. 15/185,498, filed on Jun. 17, 2016, now Pat. No. 9,982,629.

(Continued)

(51) Int. Cl.
*F02K 3/00* (2006.01)
*F01K 23/10* (2006.01)
(Continued)

(52) U.S. Cl.
CPC ............ *F02K 3/00* (2013.01); *F01K 23/10* (2013.01); *F02C 1/007* (2013.01); *F02C 1/10* (2013.01);
(Continued)

(58) Field of Classification Search
CPC .. F02K 3/00; F02K 3/077; F02C 1/007; F02C 1/10; F02C 3/10; F02C 3/13; F02C 3/04;
(Continued)

(56) References Cited

U.S. PATENT DOCUMENTS 3,791,137 A 2/1974 Jubb et al.
3,971,211 A 7/1976 Wethe et al.
(Continued)

OTHER PUBLICATIONS

Extended European Search Report dated Nov. 28, 2016 for EP Patent Application No. 16174191.3.

*Primary Examiner* — Carlos A Rivera
(74) *Attorney, Agent, or Firm* — Fishman Stewart PLLC

(57) ABSTRACT

A gas turbine engine includes a first shaft coupled to a first turbine and a first compressor, a second shaft coupled to a second turbine and a second compressor, and a third shaft coupled to a third turbine and a fan assembly. The turbine engine includes a heat rejection heat exchanger configured to reject heat from a closed loop system with air passed from the fan assembly, and a combustor positioned to receive compressed air from the second compressor as a core stream. The closed-loop system includes the first, second, and third turbines and the first compressor and receives energy input from the combustor.

20 Claims, 5 Drawing Sheets

Related U.S. Application Data

(60) Provisional application No. 62/181,887, filed on Jun. 19, 2015.

(51) Int. Cl.

| | | |
|---|---|---|
| *F02K 3/077* | (2006.01) | |
| *F02C 1/00* | (2006.01) | |
| *F02C 1/10* | (2006.01) | |
| *F02C 7/08* | (2006.01) | |
| *F02C 7/141* | (2006.01) | |
| *F02C 7/18* | (2006.01) | |
| *F22B 3/08* | (2006.01) | |
| *F01K 25/10* | (2006.01) | |
| *F02C 6/20* | (2006.01) | |
| *F02C 3/10* | (2006.01) | |
| *F02K 99/00* | (2009.01) | |
| *F02C 7/143* | (2006.01) | |
| *F02C 3/13* | (2006.01) | |
| *F02C 3/04* | (2006.01) | |

(52) U.S. Cl.
CPC ........... *F02C 3/10* (2013.01); *F02C 6/206* (2013.01); *F02C 7/08* (2013.01); *F02C 7/141* (2013.01); *F02C 7/18* (2013.01); *F02K 3/077* (2013.01); *F02K 99/00* (2013.01); *F01K 25/103* (2013.01); *F02C 3/04* (2013.01); *F02C 3/13* (2013.01); *F02C 7/143* (2013.01); *F05D 2210/10* (2013.01); *F05D 2210/13* (2013.01); *F05D 2250/311* (2013.01); *F05D 2260/213* (2013.01); *F22B 3/08* (2013.01); *Y02T 50/676* (2013.01)

(58) Field of Classification Search
CPC .. F02C 6/206; F02C 7/08; F02C 7/141; F02C 7/18; F01K 23/10; F01K 25/103; F05D 2210/10; F05D 2210/13; F05D 2250/311; F05D 2260/213; F22B 3/08; Y02T 50/676
See application file for complete search history.

(56) References Cited

U.S. PATENT DOCUMENTS

| | | |
|---|---|---|
| 8,132,412 B2 | 3/2012 | Bennett |
| 8,281,593 B2 | 10/2012 | Held et al. |
| 8,397,506 B1 | 3/2013 | Wright et al. |
| 8,464,534 B1 | 6/2013 | Riemer |
| 8,479,516 B2 | 7/2013 | Carter |
| 8,490,397 B2 | 7/2013 | Lehar |
| 8,596,075 B2 | 12/2013 | Allam et al. |
| 8,613,195 B2 | 12/2013 | Held et al. |
| 8,616,001 B2 | 12/2013 | Held et al. |
| 8,616,323 B1 | 12/2013 | Gurin |
| 8,752,382 B2 | 6/2014 | Lehar |
| 8,794,002 B2 | 8/2014 | Held et al. |
| 8,813,497 B2 | 8/2014 | Hart et al. |
| 8,814,981 B2 | 8/2014 | Stallmann |
| 8,820,083 B2 | 9/2014 | Davidson et al. |
| 8,857,186 B2 | 10/2014 | Held |
| 8,869,531 B2 | 10/2014 | Held |
| 8,887,503 B2 | 11/2014 | Sonwane et al. |
| 8,959,887 B2 | 2/2015 | Allam et al. |
| 8,966,901 B2 | 3/2015 | Held et al. |
| 2012/0067055 A1 | 3/2012 | Held |
| 2012/0131920 A1 | 5/2012 | Held et al. |
| 2012/0186219 A1 | 7/2012 | Gurin |
| 2013/0014511 A1 | 1/2013 | Gurin |
| 2013/0104547 A1 | 5/2013 | Leduc |
| 2013/0152576 A1 | 6/2013 | Mavuri et al. |
| 2013/0180259 A1* | 7/2013 | Stapp ................ F02C 1/10 60/773 |
| 2013/0239542 A1 | 9/2013 | Dasgupta et al. |
| 2013/0269334 A1 | 10/2013 | Sonwane et al. |
| 2014/0023478 A1 | 1/2014 | Maeda et al. |
| 2014/0060002 A1 | 3/2014 | Sonwane et al. |
| 2014/0084595 A1 | 3/2014 | Davidson et al. |
| 2014/0088773 A1 | 3/2014 | Davidson et al. |
| 2014/0096524 A1 | 4/2014 | Held et al. |
| 2014/0103661 A1 | 4/2014 | Kacludis et al. |
| 2014/0119881 A1 | 5/2014 | Kalra et al. |
| 2014/0208750 A1 | 7/2014 | Vermeersch et al. |
| 2014/0260341 A1* | 9/2014 | Vaisman ............. B64D 13/08 62/56 |
| 2015/0033737 A1 | 2/2015 | Mitri et al. |
| 2015/0240665 A1* | 8/2015 | Stapp ................ F02C 6/04 60/682 |
| 2015/0354450 A1* | 12/2015 | Vaisman ............ F02C 3/13 60/774 |
| 2016/0053638 A1* | 2/2016 | Stapp ................ F02C 1/10 60/650 |
| 2016/0369746 A1* | 12/2016 | Armstrong ............. F02C 3/10 |
| 2017/0022844 A1* | 1/2017 | Bastnagel ............ F28D 7/005 |
| 2017/0058834 A1* | 3/2017 | Vaisman ............. F02C 1/10 |
| 2017/0101931 A1* | 4/2017 | Armstrong ............ B64D 27/10 |
| 2017/0356340 A1* | 12/2017 | Vaisman ............. F02C 7/10 |

* cited by examiner

ENGINE DRIVEN BY SC0$_2$ CYCLE WITH INDEPENDENT SHAFTS FOR COMBUSTION CYCLE ELEMENTS AND PROPULSION ELEMENTS

CROSS-REFERENCE TO RELATED APPLICATIONS

This application is a continuation application of non-provisional application Ser. No. 15/185,498, filed Jun. 17, 2016, which claims priority to U.S. Provisional Application No. 62/181,887 filed Jun. 19, 2015, which are hereby incorporated by reference in their entirety.

FIELD OF TECHNOLOGY

An improved apparatus and method of operating a gas turbine engine includes providing power to a shaft of the gas turbine engine using carbon dioxide ($CO_2$) operated in super-critical cycle.

BACKGROUND

It has become increasingly desirable to reduce the size of power-producing or thrust-producing devices such as gas turbine engines. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the thrust expended in the turbine combustion products.

However, air can be thermodynamically inefficient, especially during cruise operation of the engine (such as in an aircraft). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result the engines are made of large and heavy components, consume large amount to fuel, and may include significant operational and maintenance expenses to cope with high combustion temperatures.

To reduce component size and complexity, some power-producing or thrust-producing devices include a super-critical carbon dioxide (s-$CO_2$) system that provides significantly improved efficiencies compared to Brayton and other air-based systems by operating in a super-critical region (operating at a temperature and pressure that exceed the critical point). That is, a phase-diagram of $CO_2$, as is commonly known, includes a "triple point" as the point that defines the temperature and pressure where solid, liquid, and vapor meet. Above the triple point the fluid can exist in liquid, vapor, or in a mixture of the both states. However, at higher temperature and pressure, a critical point is reached which defines a temperature and pressure where gas, liquid, and a super-critical region occur. The critical point is the top of the dome made up of the saturated liquid and saturated vapor lines. Above the critical point is the gaseous region.

Fluids have a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$— based systems may be operated having very dense super-critical properties, such as approximately 460 kg/m$^3$. The excellent combination of the thermodynamic properties of carbon dioxide may result in improved overall thermodynamic efficiency and therefore a tremendously reduced system size. Due to the compact nature and high power density of a power source that is powered with a super-critical cycle, the overall size of engine may be significantly reduced, as well.

A super-critical fluid occurs at temperatures and pressures above the critical point, where distinct liquid and gas phases do not exist. Close to the critical point and in the super-critical region, small changes in pressure or temperature result in large changes in density, allowing many properties of the super-critical fluid to be fine-tuned, providing a tremendous opportunity for high power energy extraction and in a small footprint relative to, for instance, an air-based thermodynamic system (such as a Brayton cycle).

However, rotational speeds for each component within known engines are not necessarily optimized, and thus overall system efficiency is not at its peak. As such, there is a need to provide system operation in power-producing devices that employ a s-$CO_2$ operation.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine is described herein, and various embodiments thereof. According to the disclosure, a gas turbine engine uses a power source to provide power to the shaft, while providing adequate power and thrust for aircraft and other purposes.

Various applications include, as examples, a turbojet, a turbofan, adaptable, turboprop and turboshaft engine configurations. The turbojet derives most of its thrust from the core stream and is generally most advantageous in high altitude and/or high mach regimes. Turbojets bypass minimal airflow around the core so they tend to be smaller diameter, noisy and drag efficient. The turbofan, on the other hand, derives most of its thrust from the bypass stream which offers advantages in fuel savings mostly in subsonic applications. Turbofans bypass a high amount of airflow around the core and appear larger in diameter. Because of the larger fan turning more slowly they produce less noise than a turbojet.

A variant of the above turbine technologies is another potential application. An adaptable engine, capable of varying the core/bypass split should also be included in the application of s-$CO_2$. Varying the bypass ratio might be accomplished by varying duct areas at inlets or exits to the core and bypass streams. An application such as this allows for both turbojet and turbofan operation so that fuel consumption can be minimized in both subsonic and supersonic regimes.

Turboprop engines characteristically attach a turbine engine to drive a propeller instead of a fan. Because propellers typically turn more slowly because of their larger diameter, a gearbox may be provided between the turbine engine and the propeller. In a turboshaft application, the turbine connects to something other than a fan or propeller, often a helicopter rotor or shaft in a marine application. Turboshafts typically include a gearbox between the turbine engine and rotor or shaft.

Figure 1:
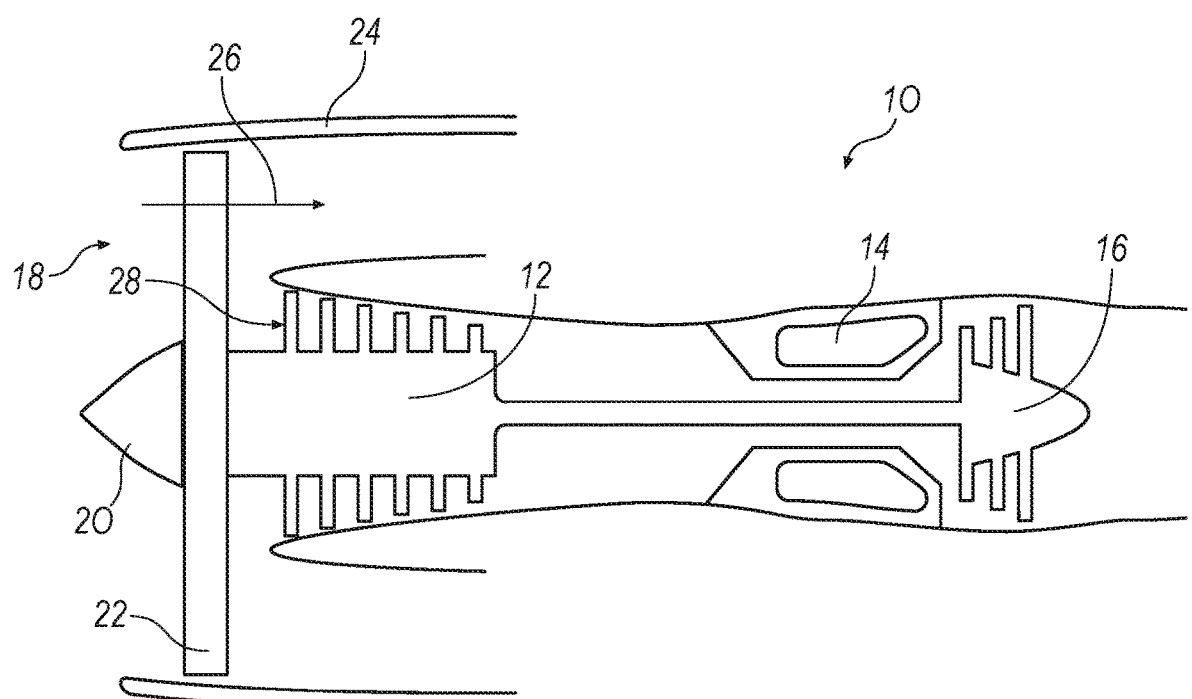
FIG. 1 is an illustration of a conventional gas turbine engine.

FIG. 1 illustrates an exemplary schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions: propulsion and power generation used to rotate the compressors, turbines, and the bypass fan. The major function, propulsion, includes fairly low air pressures and temperatures, which are approximately equal to the pressures and temperatures exiting the gas turbine engine. However, the air pressure ratios and temperatures generated in the gas turbine engine are relatively very high. The high pressure ratios and temperatures are needed to provide the power generation function. In one known example, an engine has a pressure of 180 psia and a temperature of 1600° F. at the combustor exit and pressure of 25 psia and temperature of 1000° F. at the last turbine exit provided that the pressure at the engine inlet is 15 psia. This means that the propulsion requires pressure ratio of 25/15=1.67, when the total pressure ratio in the engine is 180/15=12 covers power for both propulsion and power generation devices. In some known engines the difference in pressure ratios and combustion temperatures may be even greater.

A closed-loop system in this regard refers to a power-producing circuit that includes its own working fluid, such as a s-$CO_2$ system, and which operates in compression, expansion, and heat rejection in a closed-loop analogous to a closed-loop refrigeration system. That is, aside from incidental leakage of the working fluid, the working fluid does not otherwise contact the external environment during operation.

Thus, in general, a power-producing device includes an inner housing for passing a core stream of air, the inner housing houses a first shaft coupled to a first turbine and a first compressor, a second shaft coupled to a second turbine and a second compressor, a third shaft coupled to a third turbine and a fan assembly, a combustor positioned to receive compressed air from the second compressor, and a heat rejection heat exchanger configured to reject heat from a closed loop system. The closed-loop system includes the first, second, and third turbines and the first compressor and receives energy input from the combustor.

Figure 2:
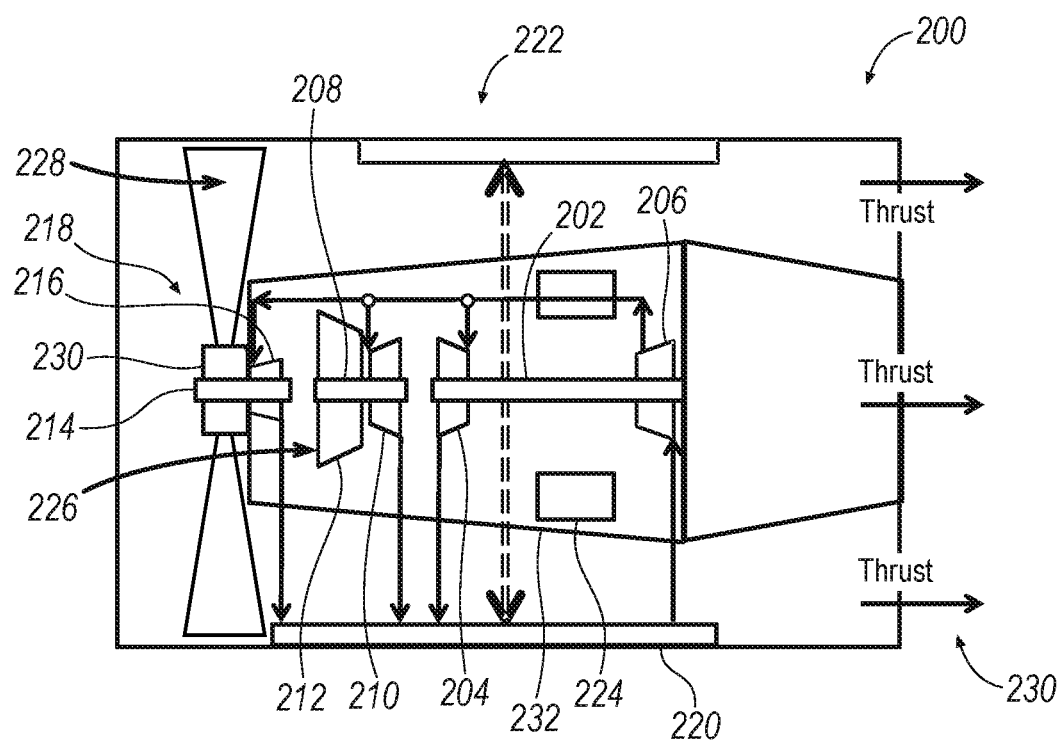
FIG. 2 is an illustration of an exemplary gas turbine having a turbofan and multiple rotational shafts and a closed-loop system power-producing circuit that includes its own working fluid, such as a s-$CO_2$ system.

FIG. 2 is an illustration of an exemplary gas turbine or turbofan 200 having multiple rotational shafts and a closed-loop system power-producing circuit that includes its own working fluid, such as a s-$CO_2$ system. Turbofan 200 includes a first shaft 202 coupled to a first turbine 204 and a first compressor 206. A second shaft 208 is coupled to a second turbine 210 and a second compressor 212. A third shaft 214 is coupled to a third turbine 216 and a fan assembly 218. A heat rejection heat exchanger 220 is configured to reject heat from a closed loop system 222 with air passed from fan assembly 218. In one example closed-loop system 222 includes carbon dioxide as a working fluid and is configured to operate as a super-critical (s-$CO_2$) system. A combustor 224 is positioned to receive compressed air from the second compressor 212 as a core stream 226. The closed-loop system 222 includes the first, second, and third turbines 204, 210, 216 and the first compressor 212, and receives energy input from the combustor 224. A bypass airflow 228 is also generated from fan assembly 218, causing air to flow across heat rejection heat exchanger 220, and combustion products from combustor 224 (resulting from combustion that results in part from core stream 226) and bypass airflow 228 both produce a thrust 230 for turbofan 200.

First compressor 206 of closed-loop system 222 is coupled to shaft 202 for compressing the working fluid, and turbine 204 expands the working fluid to extract the power therefrom. In operation, combustor 224 provides power input to the working fluid of closed-loop system 222, which in turn is expanded (and energy extracted therefrom) by turbines 204, 210, 216 before heat is rejected in heat rejection heat exchanger 220. The working fluid is compressed in compressor 206 before entering combustor 224.

Operation of the components within closed loop system 222 may be optimized by maximizing component efficiency by tailoring rotational speeds of each. For instance, fan assembly 218 typically operates at a speed much lower than that of compressors and turbines. In addition, however, compressor 212 operates to compress air for core stream 226 for combustion in combustor 224. Whereas compressor 206 is within closed-loop system 222 and is therefore configured to compress carbon dioxide as closed-loop system 222 operates in super-critical mode. Accordingly, first, the second, and the third shafts 202, 208, 214 are separately operable at different speeds from one another, and therefore operable according to their respective optimal design speeds. Further, according to one example, although shaft 214 coupled to fan assembly 218 is separately operable, a rotational speed of fan assembly 218 may be further reduced by use a gear 230 that is coupled between shaft 214 and fan assembly 218. Accordingly, gear 230 reduces a rotation of a fan blade within the fan blade assembly relative to a rotational speed of the shaft 214.

Turbofan 200 includes an inner housing 232 that houses at least a portion of the first, second, and third shafts 202, 208, 214, and passes air therethrough from fan assembly 218 to combustor 224, and bypass air 228 passes from fan assembly 128 and as bypass air 228 passing externally to inner housing 232 to provide cooling to heat rejection heat exchanger 220. Thrust is thereby provided from both combustion byproducts from combustor 224 and from bypass air 228.

Thus, FIG. 2 illustrates a s-$CO_2$ driven turbofan with independently driven compression and propulsion devices. There are two compression devices illustrated in this cycle: a low pressure (LP) compressor 212 and s-$CO_2$ compressor 204. Compressor 212 provides core air 226 to combustor 224 and s-$CO_2$ compressor 206 provides the pressure rise which drives the s-$CO_2$ power cycle. The propulsion element is a single stage fan assembly 218 which provides aircraft thrust as well as provides air flow across the heat exchange to the support power cycle.

This engine employs a s$CO_2$ power generation system. It includes a $CO_2$ compressor, a heat absorption heat exchanger integrated with the combustor, an expander, and the heat rejection exchanger built-in in the annular cross-section shaped by the nacelle and the baffle. The $CO_2$ compressor, the $CO_2$ expander, the fan assembly, and the air compressor are placed on the same shaft. The net power generated by the s-$CO_2$ cycle is used to drive the fan and the low pressure air compressor.

With each of these devices operating on an independent shaft, the task of speed matching for each of the devices is simplified. The speed for each compressor/turbine or fan/turbine shaft can be selected to optimize the performance of each set of components. This will lead to a more flexibility in propulsion system design and a more efficient s-$CO_2$ cycle.

Figure 3:
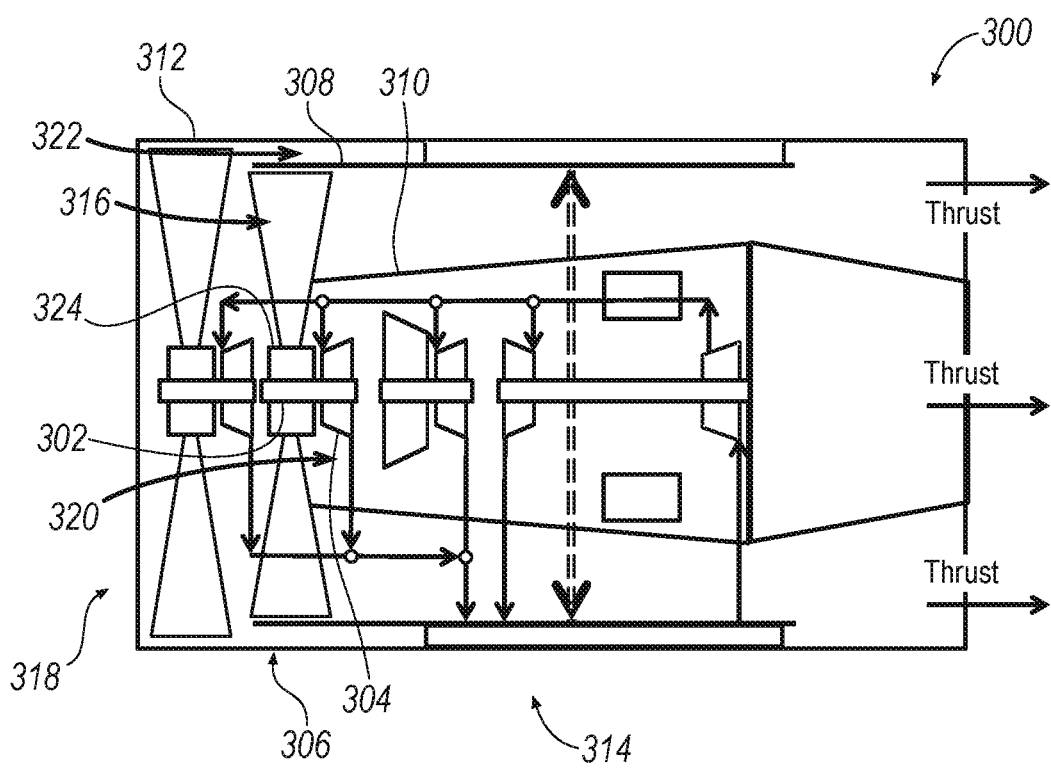
FIG. 3 is an illustration of an exemplary gas turbine having multiple rotational shafts and a two-stage fan on independent shafts.

FIG. 3 is an illustration of an exemplary gas turbine 300 having multiple rotational shafts and a two-stage fan on independent shafts. Gas turbine 300 includes components and is generally operated as described with respect to FIG. 2, but further includes a fourth shaft 302 having a fourth turbine 304 and a fan assembly 306 coupled thereto. A baffle 308 is positioned between an inner housing 310 and an outer surface or nacelle 312 of gas turbine engine 300. A closed-loop system 314 includes fourth turbine 304. Fan assembly 306 and a fan assembly 318 provide air via multiple paths to gas turbine 200. As shown, fan assembly 318 (analogous to fan assembly 218 of FIG. 2) includes a fan blade having a radius that extends proximate to outer surface 312, while fan assembly 306 includes a fan blade having a radius that is less than that of the fan blade in fan assembly 318. In such fashion, both fan assemblies 306, 318 provide bypass air 316 as thrust air that passes between baffle 308 and inner housing 310. Both fan assemblies 306, 318 also provide a core airstream 320 as core air for compression and combustion, providing thrust via combustion byproducts. Fan assembly 318, having a greater fan blade radius than that in fan assembly 306, also provides a cooling stream of air 322 that passes between baffle 308 and outer surface 312, providing cooling to closed-loop system 314. In one example, fan assembly 306 includes a gear reduction gear 324 for reducing rotation of the fan blade of fan blade assembly 306, relative to its shaft 302.

Figure 4:
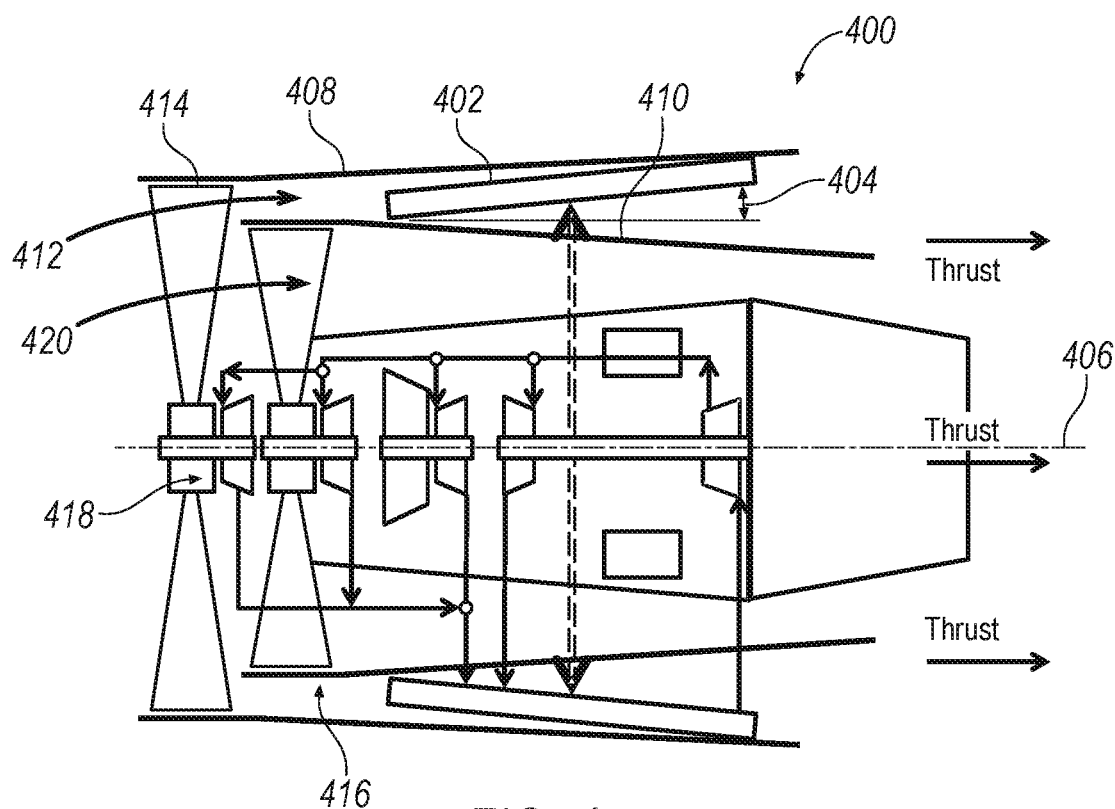
FIG. 4 is an illustration of an exemplary gas turbine having an inclined heat rejection heat exchanger.

FIG. 4 is an illustration of an exemplary gas turbine 400 having an inclined heat rejection heat exchanger 402 that increases a face area and reduces air-side pressure drop. Gas turbine 400 is configured and operates comparably to gas turbine 300 of FIG. 3, but in this example heat rejection heat exchanger 402 is positioned at an angle 404 with respect to a central axis 406 of gas turbine 400. To accommodate heat rejection heat exchanger 402, outer surface 408 and baffle 410 are designed, accordingly, such that cooling air 412 passes from fan assembly 414, while both fan assemblies 414 and 416 provide core stream of air 418 and bypass air 420. Accordingly, heat transfer within heat exchanger 402 is enhanced due to an increased amount of turbulence within stream 412 that occurs as the air passes through and along heat exchanger 402.

Figure 5:
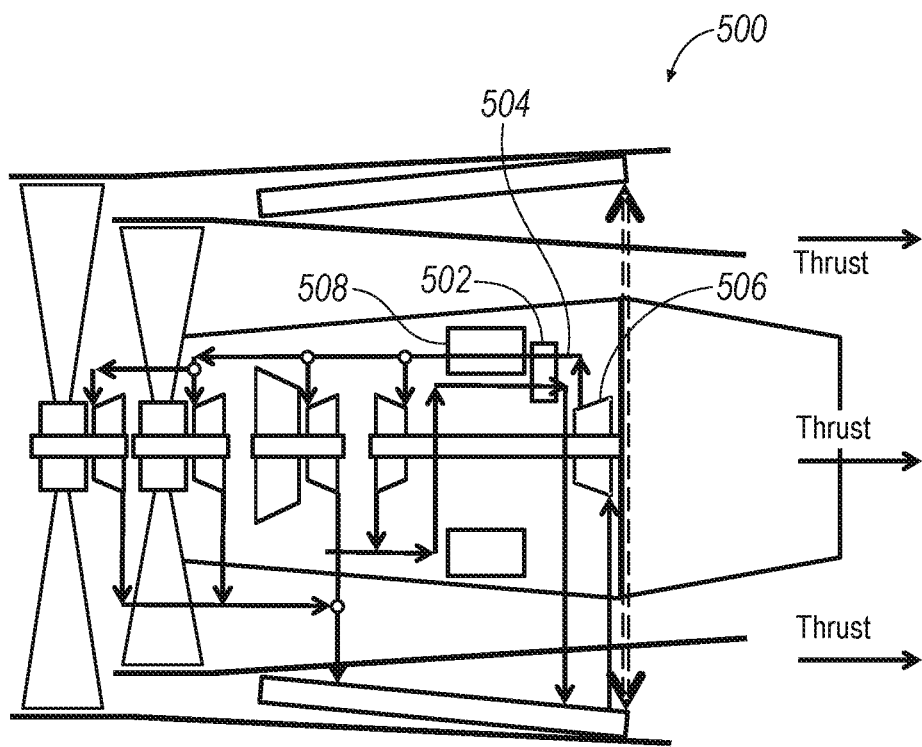
FIG. 5 is an illustration of an exemplary gas turbine having a recuperative heat exchanger.

FIG. 5 is an illustration of an exemplary gas turbine 500 having a recuperative heat exchanger 502. Gas turbine 500 is configured and operates comparably to that of FIG. 4, while further including recuperative heat exchanger 502 that exchanges heat from the working fluid of the closed-loop system between an outlet 504 of turbine 506 and an input 508 to the combustor. Overall system efficiency is thereby improved, as the working fluid is cooled in recuperative heat exchanger 502 prior to entering the combustor, and the working fluid is heated in recuperative heat exchanger 502 prior to entering the heat rejection heat exchanger. The added recuperative heat exchanger improves the thermodynamic efficiency of the power generation option.

Figure 6:
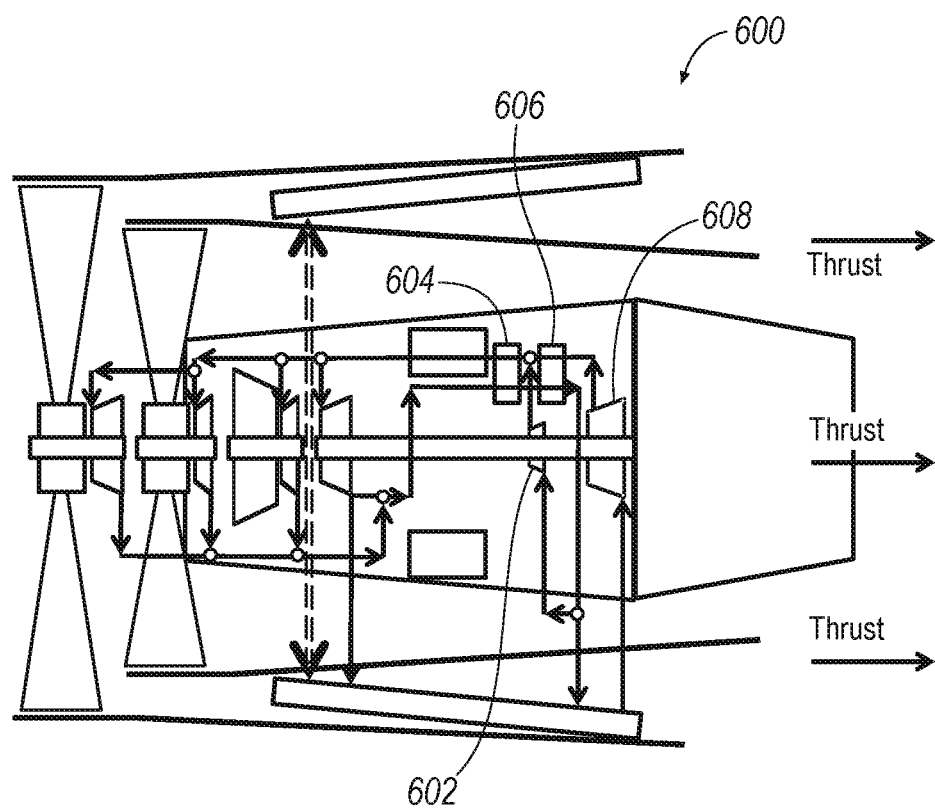
FIG. 6 is an illustration of an exemplary gas turbine having a pre-compression compressor.

FIG. 6 is an illustration of an exemplary gas turbine 600 having a pre-compression compressor 602, and a low temperature recuperative heat exchanger 604 and a high temperature recuperative heat exchanger 606. Gas turbine 600 is otherwise configured and operates comparably to that of FIG. 5. Overall system efficiency is thereby improved, as the working fluid is pre-compressed in pre-compression compressor 602, and both recuperative heat exchangers 604, 606 further exchange heat throughout the process after pre-compression and after primary compression in compressor 608.

Figure 7:
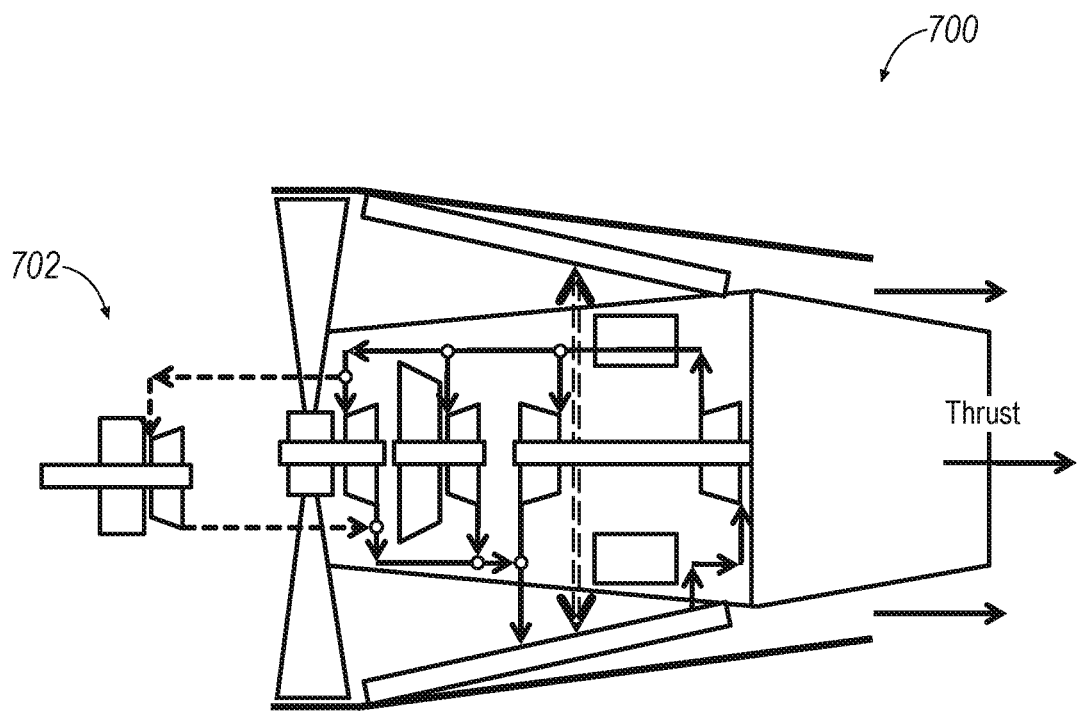
FIG. 7 is an illustration of an exemplary gas turbine having an additional gearbox driven by a working fluid.
Figure 8:
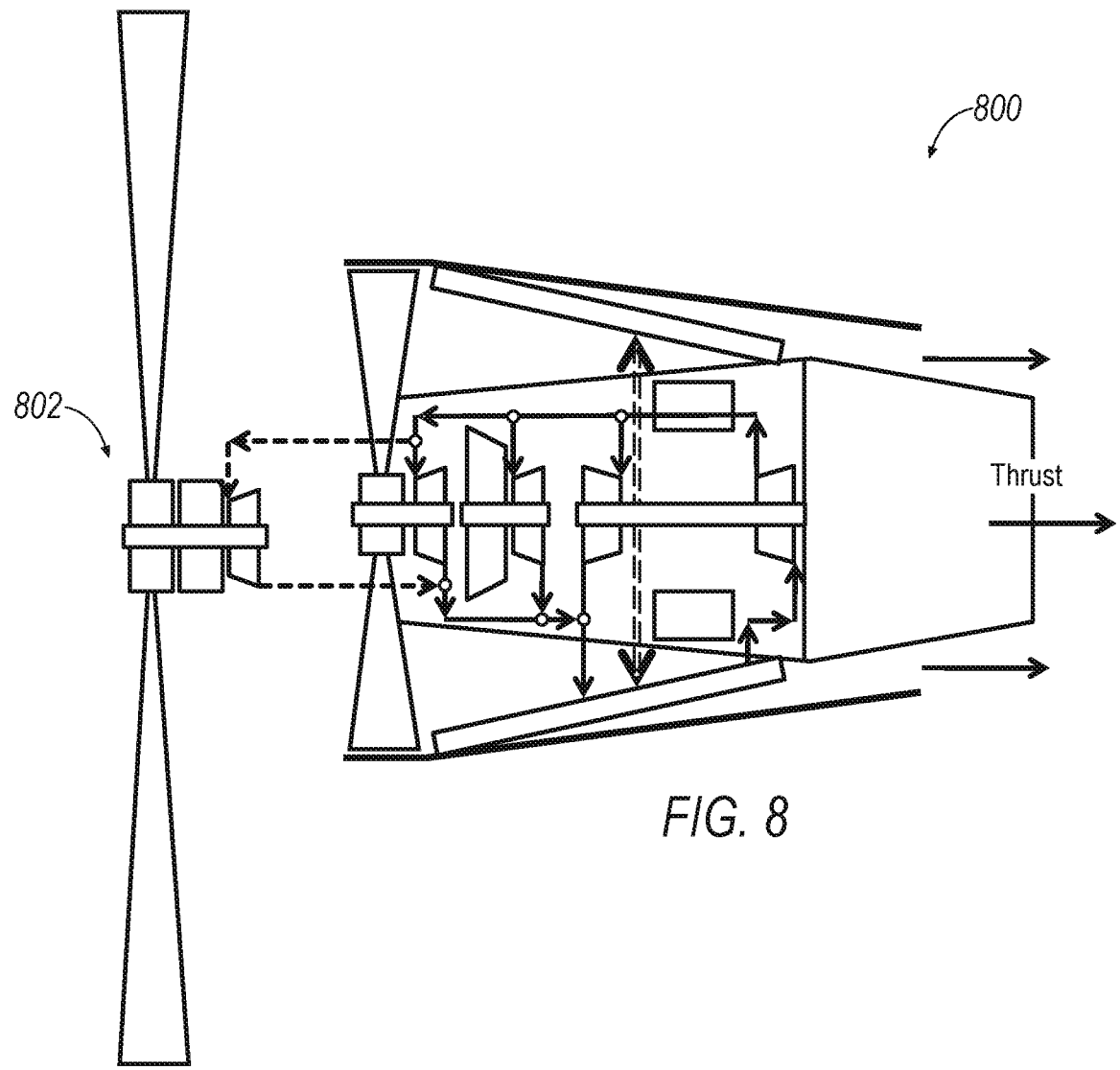
FIG. 8 illustrates an exemplary gas turbine having a turboprop configuration.

FIGS. 7 and 8 illustrate exemplary gas turbines 700 and 800 having an additional gearbox 702, 802 driven by the working fluid, as illustrated. Turboshaft 700 and turboprop 800 configurations can utilize similar core technologies as the turbofan discussed earlier. These configurations are illustrated with a base core s-$CO_2$ cycle in FIGS. 7 and 8. Both are illustrated with a respective gear box 702, 802. However, the presence of the gearbox depends on the load speed requirements, as well as gearbox and turbine sizing.

Thus, in operation, a method of providing power via a gas turbine engine includes powering a first shaft via a closed loop system that passes a working fluid from a first compressor to a combustor, receives power from combustion in the combustor, passes the working fluid from the combustor to a first turbine, and cools the working fluid in a heat rejection heat exchanger, powering a second shaft using a second turbine of the closed loop system that is coupled to the second shaft, to provide a core stream of air via a second compressor to the combustor, and powering a third shaft using a third turbine of the closed loop system that is coupled to the third shaft, to provide power to a fan assembly that provides both the core stream of air to the second compressor, and to provide a cooling stream of air to the heat rejection heat exchanger.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A gas turbine engine, comprising:
   a first shaft coupled to a first turbine and a first compressor;
   a second shaft offset axially from the first shaft, the second shaft coupled to a second turbine and a second compressor;
   a heat rejection heat exchanger configured to reject heat from a closed loop system to bypass air of the gas turbine engine;
   a combustor configured to combust air from the second compressor; wherein the closed-loop system:
   includes the first and second turbines and the first compressor;
   receives energy input from the combustor; and
   provides power from the combustor to the first and second turbines.

2. The gas turbine engine of claim 1, wherein the first and second shafts are coaxially aligned with one another.

3. The gas turbine engine of claim 1, wherein the closed-loop system includes carbon dioxide as a working fluid.

4. The gas turbine engine of claim 1, further comprising a third shaft coupled to a third turbine and a fan assembly, wherein the bypass air is passed from the fan assembly to provide cooling to the heat rejection heat exchanger.

5. The gas turbine engine of claim 4, further comprising a gear coupled to the third shaft that reduces a rotation of a fan blade within the fan assembly relative to a rotational speed of the third shaft.

6. The gas turbine engine of claim 4, further comprising an inner housing that houses at least a portion of the first, second, and third shafts, and passes air therethrough from the fan assembly to the combustor, and the bypass air passes from the fan assembly and the bypass air passing externally to the inner housing to provide cooling to the heat rejection heat exchanger.

7. The gas turbine engine of claim 4, further comprising a fourth shaft having a fourth turbine and a second fan assembly coupled thereto, and a baffle positioned between the inner housing and an outer surface of the gas turbine engine, wherein:
   the closed-loop system includes the fourth turbine; and
   the second fan assembly provides:
      bypass air as thrust air that passes between the baffle and the inner housing; and
      cooling air.

8. The gas turbine engine of claim 1, the closed loop further comprising a recuperative heat exchanger that exchanges heat from the working fluid between an outlet of the first turbine and an input to the combustor.

9. A method of providing power is a gas turbine engine, comprising:
   powering a first shaft via a closed loop system that passes a working fluid from a first compressor to a combustor, receives power from combustion in the combustor, passes the working fluid from the combustor to a first turbine, and cools the working fluid with bypass air in a heat rejection heat exchanger;
   passing the working fluid from the combustor and powering a second shaft using a second turbine of the closed loop system that is coupled to the second shaft, to provide a core stream of air via a second compressor to combust the core stream of air in the combustor; and
   passing the working fluid from the combustor to provide power to a fan assembly that provides both the core stream of air to the second compressor, and provides a cooling stream of air to the heat rejection heat exchanger:
   wherein the closed-loop system:
      includes the first and second turbines and the first compressor;
      receives energy input from the combustor; and
      provides power from the combustor to the first and second turbines.

10. The method of claim 9, wherein the first shaft and the second shaft are colinear with one another.

11. The method of claim 9, wherein the closed-loop system includes carbon dioxide as a working fluid.

12. The method of claim 9, further comprising powering a third shaft using a third turbine of the closed loop system that is coupled to the third shaft.

13. The method of claim 12, further comprising operating the first, the second, and the third shafts separately and at different speeds from one another.

14. The method of claim 12, further comprising operating a gear that is coupled to the third shaft that reduces a rotation of a fan blade within the fan assembly relative to a rotational speed of the third shaft.

15. The method of claim 12, further comprising passing air through an inner housing that houses at least a portion of the first, second, and third shafts, and from the fan assembly to the combustor, and passing the bypass air from the fan assembly and the bypass air that passes externally to the inner housing to provide cooling to the heat rejection heat exchanger.

16. The method of claim 9, wherein the gas turbine further comprises a fourth shaft having a fourth turbine and a second fan assembly coupled thereto, and a baffle positioned between the inner housing and an outer surface of the gas turbine engine, and the closed-loop system includes the fourth turbine;
   the method further comprising providing the bypass air via the second fan assembly and as thrust air that passes between the baffle and the inner housing.

17. A power-producing device, comprising:
   an inner housing for passing a core stream of air, the inner housing houses:
      a first shaft coupled to a first turbine and a first compressor;
      a second shaft coupled to a second turbine and a second compressor, the second shaft axially offset from the first shaft;
      a combustor configured to combust air from the second compressor; and
      a heat rejection heat exchanger configured to reject heat from a closed loop system to bypass air that is passed from a fan assembly;
   wherein the closed-loop system:
      includes the first and second turbines and the first compressor;
      receives energy input from the combustor; and
      provides power from the combustor to the first and second turbines.

18. The power-producing device of claim 17, wherein the first shaft is colinear with the second shaft.

19. The power-producing device of claim 17, wherein the closed-loop system includes carbon dioxide as a working fluid.

20. The power-producing device of claim 17, wherein the inner housing further houses a third shaft coupled to a third turbine and a fan assembly, wherein the bypass air is passed from the fan assembly to provide cooling to the heat rejection heat exchanger, and wherein the first, the second, and the third shafts are separately operable at different speeds from one another.

\* \* \* \* \*